United States Patent [19]

Birdwell

[11] 4,016,393

[45] Apr. 5, 1977

[54] SYSTEM FOR LAYING PIPE
[75] Inventor: J. C. Birdwell, Houston, Tex.
[73] Assignee: Midcon Pipeline Equipment Co., Houston, Tex.
[22] Filed: Feb. 19, 1975
[21] Appl. No.: 550,943
[52] U.S. Cl. .................. 219/59; 61/108; 219/60 R
[51] Int. Cl.² ................ B23K 31/06; B63B 35/04
[58] Field of Search ............ 61/72.3; 219/59, 60 R, 219/67

[56] References Cited

UNITED STATES PATENTS

| 1,954,160 | 4/1934  | Wheeler    | 219/59     |
| 3,014,118 | 12/1961 | Vassar     | 219/59     |
| 3,085,146 | 4/1963  | Ferreruela | 219/60 R   |
| 3,251,332 | 5/1966  | Vassar     | 61/72.3 X  |
| 3,331,212 | 7/1967  | Cox et al. | 61/72.3    |
| 3,437,787 | 4/1969  | Chyle      | 21/60 R X  |
| 3,472,035 | 10/1969 | Broussard et al. | 61/72.3 |
| 3,533,244 | 10/1970 | Shaw       | 61/72.3    |
| 3,619,897 | 11/1971 | Oppermann et al. | 21/59 X |
| 3,645,105 | 2/1972  | Nolan, Jr. | 61/72.3    |

Primary Examiner—Bruce A. Reynolds
Assistant Examiner—N. D. Herkamp
Attorney, Agent, or Firm—Carl B. Fox, Jr.

[57] ABSTRACT

System for laying pipe, wherein elongate flat sheets of metal are formed and welded to form pipe and wherein the pipe may be discharged for laying in a vertical direction or in a horizontal direction, or in any angular direction therebetween. The apparatus is mounted on a support vehicle or structure capable of traveling over water or land from which the pipe is discharged for laying.

47 Claims, 4 Drawing Figures

SYSTEM FOR LAYING PIPE

BACKGROUND OF THE INVENTION

The laying of pipe under water or on land according to present methods presents some serious problems. According to present methods, pipe joints 40 feet in length, or sometimes twice or three times that length, are welded together end-to-end as the laying of a pipeline proceeds. The welding of the end-to-end pipe joints is troublesome because before welding the pipe ends must be prepared by beveling or machining and the pipe joints must be aligned, made circular and abutted in preparation for welding. When the pipe laying is done from a moving or movable vehicle or support, the motion of the vehicle or support causes problems. These problems are severe when pipe laying is done from a floating vessel, such as a lay barge, because the vessel is moved by the water movement and wind as well as by the travel movement of the vessel. When the pipeline is made up of individual lengths of pipe, the vessel or other carrier must be stopped and started for addition of each length or joint of pipe. This involves trouble of control, and adds to the utilization of power and increases cost.

When pipe is laid from a movable vessel or vehicle, the pipeline behind the vehicle is fixed in place while the vessel or vehicle is moving, and it is necessary to adjust the pipe tension as it leaves the carrier in order to prevent damage to the pipe and to the apparatus and carrier. Therefore, complex and expensive pipe tensioning apparatuses must be used in conjunction with the pipe laying. Many other serious problems, known in the art, are encountered in connection with the laying of pipe from a moving vessel, vehicle or other movable supporting structure.

SUMMARY OF THE INVENTION

The invention provides a system for forming and laying pipe from a movable vessel, vehicle, or other movable supporting structure. Instead of joining individual lengths or joints of pipe together end-to-end, as is done in substantially all existing systems, this pipe laying system enables the forming and laying of pipe in a single continuous operation. Steel or other metal plate is supplied in sheet or roll form, and is continuously formed to circular shape and welded by a longitudinal weld to form pipe. The pipe forming and welding operation is continuous, so that pipe is continuously discharged from the apparatus for laying. The system according to the invention includes all of the auxiliary preparation and testing steps necessary to the forming and laying of pipe for a pipeline. Provision is included for welding together end-to-end steel plates to form a continuous strip from which the pipe is formed, or alternatively, the pipe may be formed from a continuous roll of steel plate. Provision is made for edge preparation of the steel plate strip prior to forming and welding into pipe, and for x-ray inspection of all welds. Provision is included for tensioning the pipe to provide for movement of the apparatus relative to the pipeline. The method also includes provision for abandoment of the pipe end, which is important when pipe is laid from a floating vessel. As stated earlier, the pipe may be discharged for laying vertically, horizontally, or at any required angle therebetween.

The system afforded according to the invention will be economical by comparison with existing systems. The pipe tensioning system employed requires less power than conventional systems. The pipeline may be laid continuously instead of discontinuously joint by joint. In some cases, the laying of the pipe may include means for transmitting traveling force to the vessel or other apparatus upon which the apparatus is supported. Provision is made for inspection and testing of the pipeline by internally disposed devices, and these devices need not be repeatedly removed and reinserted for this purpose and may remain continuously in place.

A principal object of the invention is to provide a system for laying pipe from a moving vehicle, vessel, or other movable structure. Another object of the invention is to provide such a system wherein the pipe laying is continuous and wherein proper pipe tensioning is obtained. A further object of the invention is to provide such a system wherein the pipe may be tested and inspected as necessary during laying. Still another object of the invention is to provide such a system wherein the pipe is formed from a continuous or discontinuous strip of steel plate. Another object of the invention is to provide such a system wherein the pipe may be discharged for laying at any angle and in any direction, to be useful in laying pipe in either deep or shallow water.

Other objects and advantages of the invention will appear from the following detailed description of preferred embodiments, reference during the description being made to the accompanying drawings.

BRIEF DESCRIPTIONS OF THE DRAWINGS

DESCRIPTIONS OF THE PREFERRED EMBODIMENTS

Figure 1:
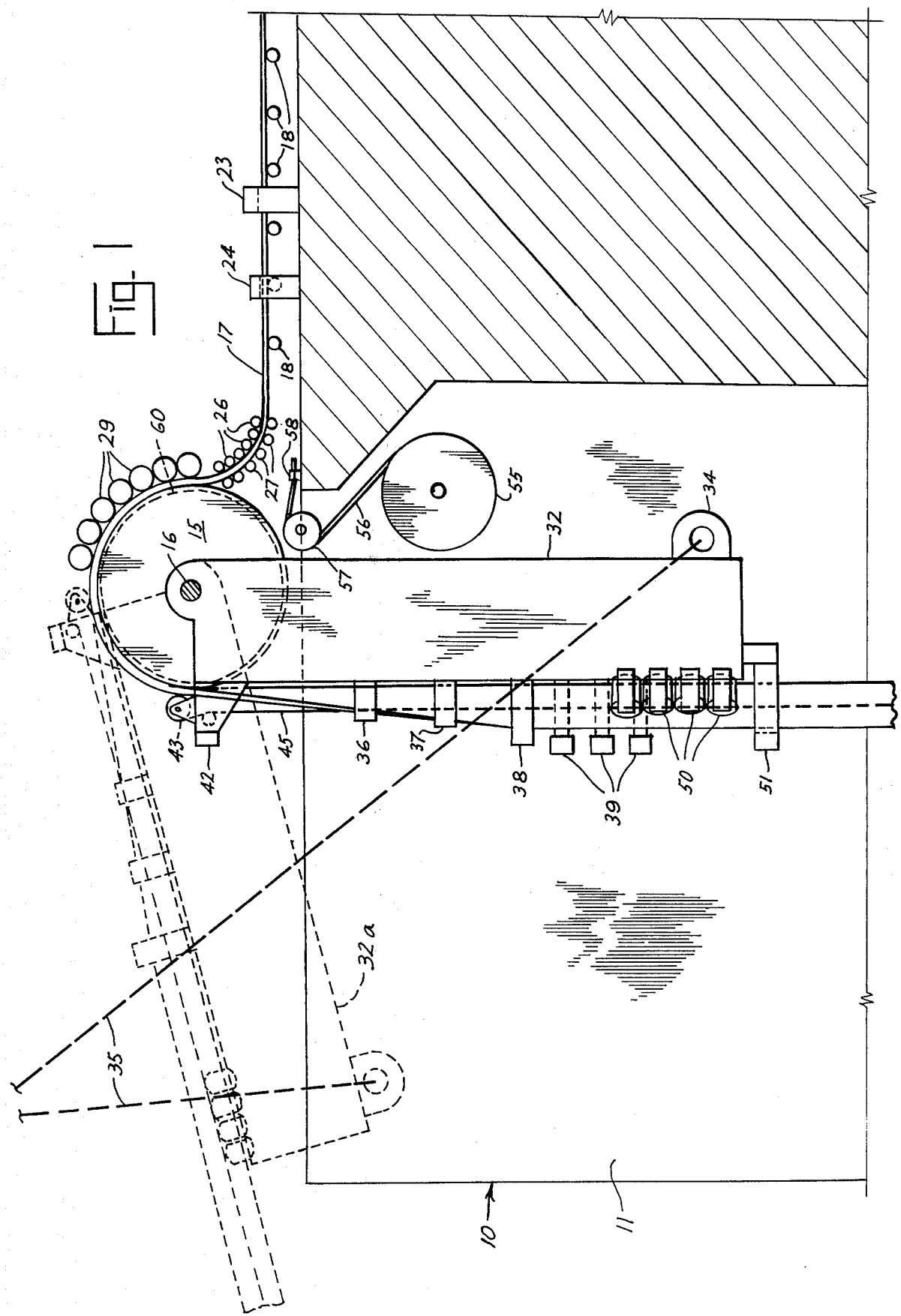
FIG. 1 is a side elevation, partially schematic, showing a preferred form of apparatus and method of pipe forming and laying according to the invention.
Figure 2:
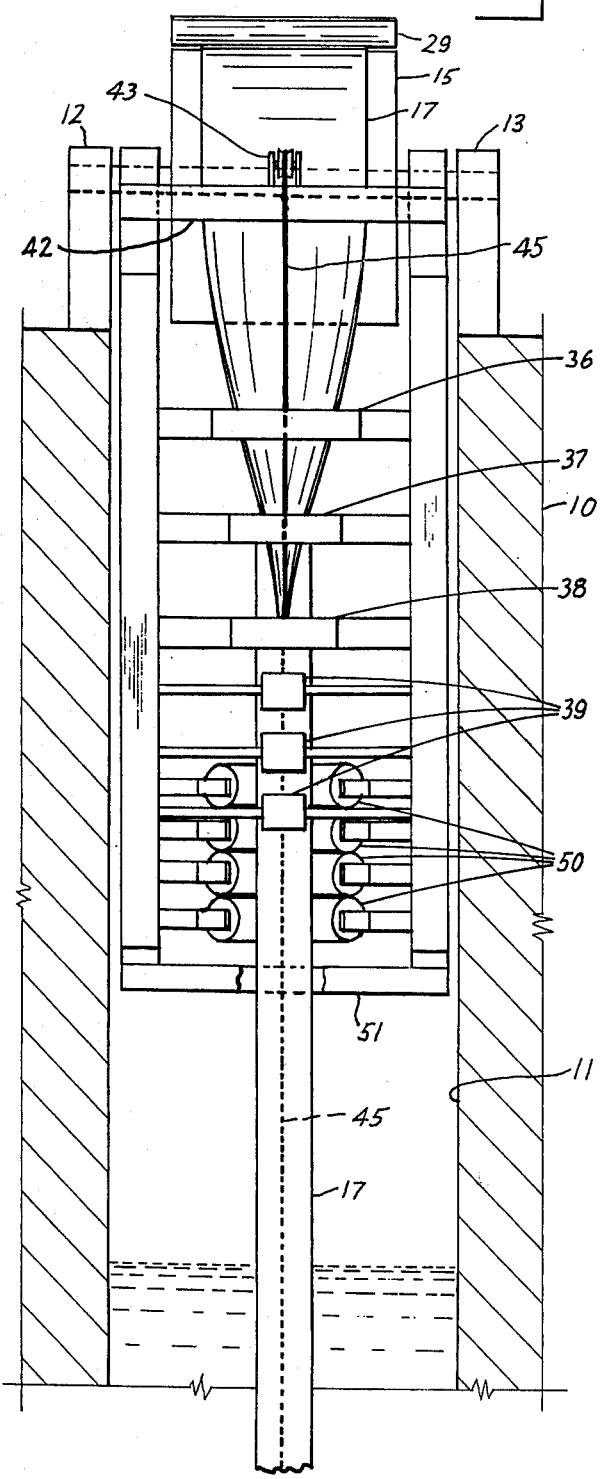
FIG. 2 is an end elevation of the apparatus shown in FIG. 1.
Figure 3:
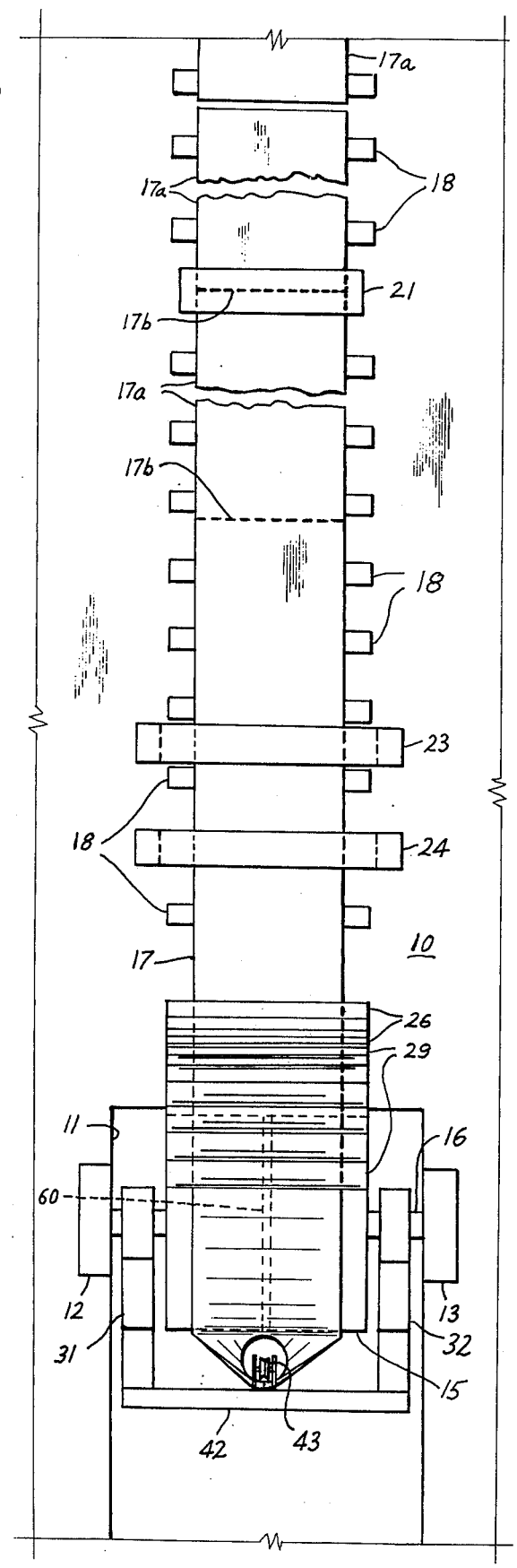
FIG. 3 is a plan view of the apparatus shown in FIGS. 1 and 2.

Referring to the drawings in detail, and first to FIGS. 1-3, the apparatus according to the invention is supported by a supporting vehicle or structure 10. The vehicle or structure 10 in the drawings is shown to be a floating vessel, such as a lay barge. Vehicle or structure 10 may, however, be any movable support for the apparatus. Vehicle or structure 10, for example, may be a truck, trailer, a float or platform supported by another vehicle or vessel, or any other suitable support. While the pipeline is illustrated as being laid beneath the surface of a body of water, the pipe may be laid on a land surface, or in a ditch or trench, into a well, or the apparatus may be employed for setting pilings or other columns for structural purposes. For example, the apparatus may be used on water to provide pilings for construction of a bridge or viaduct, or for construction of a pier or jetty or any other similar structure, or the apparatus may be used on land for construction of piers for elevated roadways and/or structures.

Vessel 10 has a slot or well 11 through which the apparatus according to the invention extends. The slot or well is not necessary, and the apparatus could be installed from the side or end of the vessel. At opposite sides of well 11 there are provided supports 12, 13 which support a large roller 15 mounted on a shaft 16 extending between supports 12 and 13. A strip of steel plate 17, or a strip formed of other metal or other suitable material, is continuously delivered to roller 15. The metal strip is supported by a plurality of roller supports 18 forming a conveyor for the strip.

Metal strip 17 will usually be flat, but may have an upwardly concave curvature if desired. Metal strip 17 may be provided from a roll, or may, as shown in FIG. 3, be formed of elongate metal strips welded together end-to-end. In FIG. 3, a section 17a of the strip is illustrated to be welded into the strip at transverse welds 17b. A welding apparatus 21 is provided for welding the individual elongate plates together to form a continuous strip of metal plate. An edge finishing device 23 is provided for preparing the edges of the metal plate or strip for welding into a pipe of circular cross section. For welding into pipe, the strip must usually have edge bevels or other edge formations to adapt to the welding operation, and the strip edges must be smooth and uniform for this purpose. A device 24 for x-ray or other inspection of the cross welds and metal strip may be provided.

The strip 17 is passed between opposed rollers 26, 27 which form and direct the strip onto roller 15. The strip passes beneath tensioning rollers 29, provided in any suitable plurality, which are driven rollers adapted to adjust the tension of the pipe and metal strip for discharge of the pipe from supporting vessel 10, to serve the purpose of a conventional pipe tension apparatus. For this purpose, roller 15 is an idler roller and rollers 29 are variably controlled reversable powered rollers, or roller 15 is a variably controlled reversable powered roller and rollers 29 are idler rollers, the former being preferred. A pair of pivotal supports 31, 32 are supported one to each side of roller 15. The pivotal supports 31, 32 are pivotally supported for rotation about shaft 16, as shown. More complex supports than shown may be provided, and the showing in the drawings is simplified. As shown in FIG. 1, the pivotal supports 31, 32 may be pivotally moved to other angular positions than vertical. For example, the supports 31, 32 may be moved to the almost horizontal position 32a illustrated in dashed lines in FIG. 1. The supports 31, 32 each have a bracket 34 to which a cable 35 from a suitable winch or hoist (not shown) may be connected for pivotally lifting elements 31, 32 to any desired angular position. The cable 35 may include constant tension means for supporting pivotally movable support means 31, 32 so that pivotally movable support means 31, 32 float to relieve stress on the pipe.

The metal strip 17 is delivered over roller 15 and then directed parallel to the longitudinal direction of supports 31, 32, the vertical position of these members being shown in FIG. 1. In its downward travel, the strip is passed through forming elements 36–38 which form the strip or plate into the circular configuration of a pipe. Usually the forming devices 36–38 will include forming rollers to shape the plate to circular configuration, but any device suitable for forming the plate into the shape of a pipe may be substituted such as those shown in U.S. Pat. Nos. 3,251,332 and 3,085,146.

The pipe forming apparatus is secured to the supports 31, 32 by welding or bolting or other suitable manner known in the art. After leaving the pipe forming devices 36–38, the circularly formed plate passes one or more welding stations 39 which weld a longitudinal seam and continuously convert the strip or plate into pipe. Welding apparatuses such as those shown in U.S. Pat. Nos. 2,670,423, 3,084,246, and 3,596,050, and many others known in the art and usable by those skilled in the art, may be used. The welding equipment may readily be supported by known means from supports 31, 32. Internal equipment necessary for welding may be supported by a cable 45, to be described. Movements of the welding equipment longitudinally of the pipe, if necessary, may readily be provided by those skilled in the art.

A bracket structure 42 is supported from the upper ends of pivotal supports 31–32 and includes a reel or roller 43 by use of which a cable 45 may be directed into the pipe formed by the welding operation. If internal welding of the longitudinal pipe seam is required, a suitable welding apparatus may be dropped into the formed strip to provide this welding operation. X-ray and other suitable inspection equipment may likewise be dropped into the pipe from suitable conveying and supporting elements supported by or above bracket 42. As should be clearly understood, any apparatus may be run into the pipe at the pipe formation stage, since the pipe is open for such insertions. This may be done regardless of the angle in which members 31, 32 are positioned. It will even be possible to internally coat the pipe after the longitudinal weld is completed if such be desired.

A plurality of roller supports 50 are provided at the lower or outer ends of pivotal members 32 to provide rolling engagement of the pipe with these members and to absorb any shock caused by relative pipe-support movements.

A pipe wrapping apparatus 51 of any suitable form may be carried at the ends of members 31, 32 to wrap the pipe before laying it into a pipeline. Such a wrapping apparatus may be employed for pilings or columns formed by the apparatus. A pipe wrapping apparatus such as the forms shown in U.S. Pats. Nos. 2,253,848, 2,344,264 and 2,471,580 may, supported in any suitable manner by supports 31, 32, be positioned about the pipe to clean, wrap and coat the pipe.

As should be clear, all of the devices required for manufacturing and treating and testing the pipe are moved with pivotal supports 31, 32, so that they are in position for their functions regardless of the angle at which pivotal members 31, 32 are disposed.

When a pipeline is laid under water, it sometimes becomes necessary to temporarily abandon the pipeline because of weather conditions or some failure of the lay barge, or the like. By abandonment of the pipeline it is meant that the pipe must be disconnected from the laying vessel and laid on the ocean floor, or suspended from floats, or the like, in order that the pipe laying may be discontinued for resumption at a later time. To prevent damage to the pipeline during such abandonment and in order that the pipeline may be retrieved later on, it is necessary to connect a cable or other restraining device to the pipeline prior to the abandonment. For this purpose a reel 55 containing a suitable length of cable 56 is supported across well 11. Cable 56 is passed over an idler roller 57 and anchored at 58. When it is necessary or desired to abandon the pipeline, the end of cable 56 is connected to an end plug which is welded in the pipe at or near forming device 38. The pipe is cut off just above the plug. To draw the cable from pulley 57 to the end plug, it is necessary to cut a slot through the strip 17 on roller 15 above recess 60. The rollers 29 are used to control the decent of the pipeline and cable to the ocean floor. In order to adapt to the passage of the cable around drum or roller 15, the roller is provided with a peripheral groove or recess 60 into which the cable is received. The rollers 29 do not act directly against the cable, but act against the roller 15 to control its speed and direction of rotation, in order that the tension in the cable as it leaves the vessel will be controlled to properly lay the pipeline onto the ocean bottom, vessel 10 being moved as necessary during this operation.

The invention provides a pipe lay system, particularly suited to lay barge use but useful also for other purposes, which includes a supporting vehicle or structure containing the necessary equipment to provide a workable pipe laying system whereby flat plate, or plate with a slight curvature, of a width equal to the circumference of the pipe to be laid is supplied in roll form or joined into a continuous strip to be formed into pipe. The metal strip of proper width is rolled into a circular shape as it passes through a series of rollers, this forming the circular shape of a pipe. The edges of the plate are then joined by welding to form a continuous length of pipe which is layed to form a pipeline. The strip of plate of a width equal to the circumference of the pipe to be formed can be supplied by joining sections of plate together, or can be supplied from a roll of coiled plate. The edges of the strip are prepared by an edge preparation machine which gives the plate edges the proper configuration for welding.

The tensioning rollers 29 provide a pipe tensioning machine which can provide constant tension to or a constant force upon the plate in either direction of movement, this force or tension being adjustable. The tensioning rollers 29 provide an adjustable constant force against the roller 15, in order to properly grip the plate and control the plate travel direction and the driving force imposed by rollers 29 on the plate strip. The rollers 29 are normally the driving members and are coated with a traction type material to prevent slippage between the rollers and the plate. Roller 15 will normally be a free rolling idler roller. If desired, the rollers 29 could be idlers with roller 15 being the driving member, but this is a less convenient arrangement. Alternatively, both roller 15 and rollers 29 may be driven, either geared together or independently. The rollers of pipe forming devices 36–38 will normally not be driven, but will be idler rollers which curve the plate into a circular shape to form the pipe. The welding machines 39 may be either manually operated or automatically operated. For automatic operation, the welding machines may be mounted on an independent structure which is slidable or wheeled to be movable relative to the pipe at a controlled speed, this relative speed to be controlled by sensing the rotational speed and direction of a wheel placed against and driven by roller 15 or by one of the tensioning rollers 29. The required information is transmitted to a suitable drive mechanism for the welding machines. On the other hand, the welding machines may be fixed and engaged with the pipe, and the pipe travel speed may be adjusted by information transmitted to control the speed of rollers 29.

One advantage of the present system is that it is simpler and more economical to transport and store steel plate in flat or roll form than it is to transport and store pipe. Only a limited amount of pipe may be stored on a conventional lay barge, and a considerably longer equivalent length of pipe may be stored by storing the steel in flat or roll form. Less trips, if any, will be requied to transport steel plate to the lay barge, since in many cases the lay barge will be able to load most or all of the plate required on the barge at the dock before the pipe laying job is started. With conventional lay barges, pipe lengths must continually be transported from shore or from a supply ship or barge.

The pipe tensioning apparatus according to the invention requires considerably less power than the pipe tensioners on conventional lay barges. For pipe laid vertically, there is presently no tensioning apparatus capable of pulling upward on the pipe with the necessary force. Apparatus of conventional design for this purpose would be extremely large and expensive. According to this invention, the force of pipe forming at formers 36–38, at all angles of pipe exit, performs a considerable amount of the tensioning work that must be done on the pipe by applied power in conventional barge tensioning arrangements.

As mentioned earlier, the pipe may leave the vessel 10 or other support at any angle. In deep water, the pipe will leave the vessel 10 in a straight down vertical direction. In shallower water, the members 31, 32 may be placed at any suitable angle consistent with the laying of the pipe. With a conventional barge, the pipe leaving the barge horizontally must first bend downwardly to a vertical direction and then must bend again to a horizontal direction. Using the apparatus herein disclosed, the upper of these bends is completely eliminated. The stress forces acting on the pipe and the barge are thereby greatly reduced.

It will be realized that roller 15 and elements 31, 32 may be positioned in more elevated positions relative the supporting structure than is shown in the drawings. This will be a considerable advantage when pilings are to be disposed with their upper ends projecting from a water surface. Elevation of roller 15 and associated apparatus may also be necessary with some types of barges to maintain the welding and wrapping operations above water level.

Figure 4:
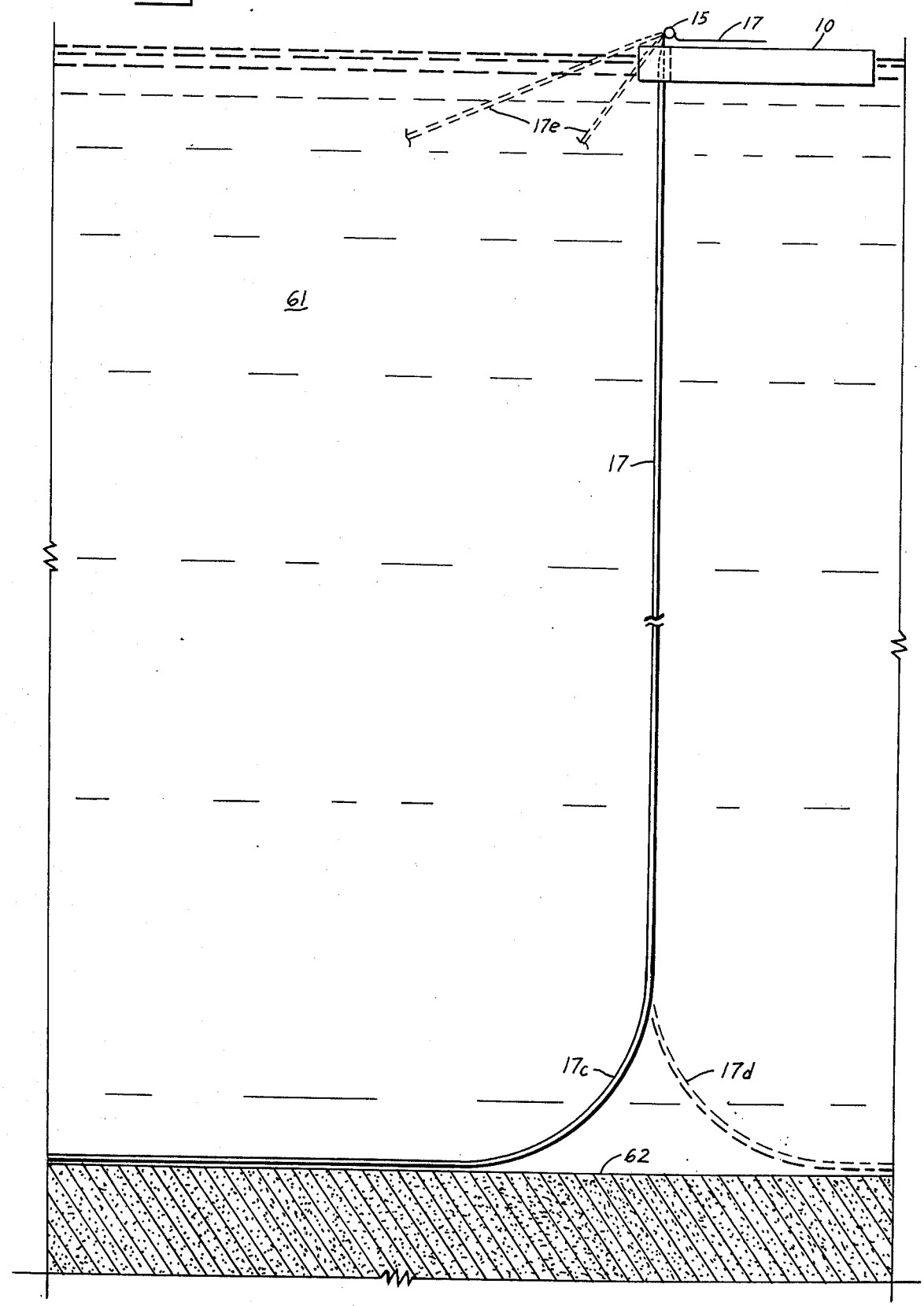
FIG. 4 is a schematic drawing illustrating the method of laying of pipe according to the invention.

Referring now to FIG. 4 of the drawings, the vessel 10 is schematically illustrated afloat in a body of water 61, for example in the ocean. The ocean bottom 62 is at a considerable depth beneath vessel 10. The pipe formed from strip 17 is disposed vertically downwardly from vessel 10. The pipe makes only one bend at 17c, instead of the double bend necessary with conventional lay barges wherein the pipe is discharged horizontally. As shown, the pipe line is laid rearwardly of the vessel 10 which is travelling toward the right in FIG. 4. It is alternatively possible to lay the pipe beneath the vessel 10, i.e. from the right as shown in FIG. 4. This pipe direction is indicated at 17d. In either case, the weight of the pipe falling toward the ocean floor and straightening will tend to move vessel 10 in the pipe laying direction, thereby supplying all or part of the motive power for moving vessel 10 through the water as pipe laying proceeds.

By changing the sizes of the forming assemblies 36–38, and moving the welding stations 39 correspondingly, the apparatus may be used to lay pipe of varying sizes. The roller 15 and conveyor 18 may carry metal strips up to their full widths, and any narrower strips may be used to form and lay smaller pipe.

As has already been mentioned, the members 31, 32 may be pivotally moved to differing angular directions 17e depending on the distance of the pipeline below the vessel 10. In deep water, the pipe 17 is disposed directly downward vertically, while in shallower water the pipe will be discharged at an angle closer to horizontal. When the apparatus is used to lay a pipe at the ground surface from a ground vehicle, the elements members 31, 32 may be horizontal or nearly horizontal. When the apparatus is used to form vertical piles or pillars, the members 31, 32 will be vertical. In addition to the uses of the apparatus already mentioned, the apparatus may be used to provide long pilings stabbed into the ocean floor to support drilling platforms, or the like.

Apparatuses having support members 31, 32 in any fixed positions may be made under the invention. If the apparatus were to be used only for laying pipe in deep water, then members 31, 32 in fixed vertical positions would be provided. If the apparatus were to be used only for laying pipe on land or in shallow water, then members 31, 32 in fixed horizontal or nearly horizontal positions would be used.

The hoist or crane to which cable 35 is connected may be designed to impose constant tension on the cable 35 while it is supporting members 31, 32 in angular positions. This provision would eliminate most of the stresses imposed on elements 31, 32 and the pipe in angular positions 32a. For example, rising or falling of the barge in heavy water would not be translated to elements 31, 32 which would remain substantially steady, so that stresses on the pipe and on members 31, 32 would be greatly reduced.

Any type of welding found to be suitable may be used in welding both the transverse welds to connect individual plates 17a together to form strip 17, and to weld the longitudinal seam of the pipe.

A feature of the invention not previously mentioned is that two or more pipe laying apparatuses as herein described may be used simultaneously to lay two or more pipelines simultaneously. This is not practical with conventional pipe laying apparatuses since it would require the simultaneous discharge from the barge of each pipe joint added to the pipeline.

While preferred embodiments of the apparatus and methods have been described and shown in the drawings, many modifications thereof may be made by a person skilled in the art without departing from the spirit of the invention, and it is intended to protect by Letters Patent all forms of the invention falling within the scope of the following claims.

I claim:

1. Apparatus for continuously discharging pipe from a traveling support, comprising means supported by said traveling support for longitudinally conveying a continuous horizontally disposed flat metal strip of uniform width in a generally horizontal direction, means disposed at the discharge from said conveyor means for receiving the discharged strip and for controlling the tension of said discharged strip beyond said tension controlling means, means for directionally directing said discharged strip from said traveling support with said discharged strip being drawn from said tension controlling means by gravity, said directional directing means being adjustable to any angle between an upper horizontal position and a lower vertical position so that said strip may be directed from said traveling support in any direction from a horizontal outward direction to a vertical downward direction, and means for forming and welding said discharged strip into a pipe while said discharged strip is directionally directed by said directing means and in predetermined longitudinal tension between said tension controlling means and the downward bias of gravity.

2. The combination of claim 1, wherein said strip and pipe are directed vertically downwardly to form a support for a structure.

3. The combination of claim 1, wherein said pipe is directed by said directional directing means toward a continuous pipeline being laid form said travelling support.

4. The combination of claim 3, said tension controlling means comprising first and second roller means disposed oppositely against opposite sides of said strip.

5. The combination of claim 4, at least one of said first and second roller means comprising variably controlled reversable powered roller means.

6. The combination of claim 4, said first roller means comprising a single enlarged roller and said second roller means comprising plural rollers arcuately disposed around said single enlarged roller.

7. The combination of claim 6, said first roller means comprising an idler roller and said second roller means comprising variably controlled reversable powered rollers.

8. The combination of claim 6, said first roller means comprising a variably controlled reversable powered roller and said second roller means comprising idler rollers.

9. The combination of claim 6, said directional directing means comprising pivotally movable support means.

10. The combination of claim 9, said support means being pivotally movable about the axis of said first roller means.

11. The combination of claim 6, said longitudinal conveying means for said strip comprising plural spaced parallel rollers.

12. The combination of claim 11, including plural opposed roller means disposed along a curved path for directing said strip to between said first and second roller means.

13. The combination of claim 6, said first roller means having recess means around its periphery, and including restraint means receivable in said recess means adapted for connection to the end of said pipe when said pipeline is to be abandoned, said second roller means cooperating with said first roller means to control the tension of said restraint means during abandonment and recovery.

14. The combination of claim 6, said first roller means being disposed in elevated position at one end of said longitudinal conveying means, and said second roller means being disposed arcurately around an upper portion of said first roller means.

15. The combination of claim 14, said first roller means comprising an idler roller and said second roller means comprising variably controlled reversable powered rollers.

16. The combination of claim 14, said first roller means comprising a variably controlled reversable powered roller and said second roller means comprising idler rollers.

17. The combination of claim 14, said directional directing means comprising pivotally movable support means.

18. The combination of claim 17, said support means being pivotally movable about the axis of said first roller means.

19. The combination of claim 14, said longitudinal conveying means for said strip comprising plural spaced parallel rollers.

20. The combination of claim 19, including plural opposed roller means disposed along a curved path for directing said strip to between said first and second roller means.

21. The combination of claim 14, said first roller means having recess means around its periphery, and including restraint means receivable in said recess means adapted for connection to the end of said strip when said pipeline is to be abandoned, said second roller means cooperating with said first roller means to control the tension of said restraint means during abandoment and recovery.

22. The combination of claim 6, including means supported on said directional directing means for wrapping the pipe following forming and welding thereof.

23. The combination of claim 6, including means supported on said directional directing means for coating the pipe following forming and welding thereof.

24. The combination of claim 1, said directional directing means comprising pivotally movable support means.

25. The combination of claim 24, said forming means comprising at least one roll forming means.

26. The combination of claim 24, said welding means comprising at least one welding machine.

27. The combination of claim 26, at least one welding machine being insertable into said pipe where said pipe is open during forming thereof.

28. The combination of claim 26, at least one welding machine being disposed exteriorly of said pipe after forming thereof.

29. The combination of claim 26, said welding means being adapted to travel at a constant but adjustable speed along the pipe as the pipe is welded and discharged.

30. The combination of claim 24, including constant tension means for supporting said pivotally movable support means whereby said pivotally movable support means floats to relieve stress on said pipe.

31. The combination of claim 1, including pipe inspection means insertable into said pipe where said pipe is open during forming thereof.

32. The combination of claim 31, said pipe inspection means comprising x-ray inspection means for inspecting the longitudinal weld of said pipe.

33. The combination of claim 1, said strip being supplied in roll form.

34. The combination of claim 1, said strip being supplied in the form of substantially flat plates, and including means for welding said plates together end to end to form said strip.

35. The combination of claim 1, said traveling support being a floating vessel.

36. The combination of claim 1, said traveling support being a powered land vehicle.

37. The combination of claim 1, wherein said pipeline is a vertical column for use as a piling.

38. Apparatus for continuously discharging pipe from a traveling support, comprising means for longitudinally conveying a continuous metal strip of uniform width, means for controlling the tension of said strip discharged from said conveying means, means for forming and welding said discharged strip into a pipe, and pivotally movable support means for directing said pipe from said traveling support to a continuous pipeline being laid from said traveling support; said tension controlling means comprising first and second roller means disposed opposedly against opposite sides of said strip, said first roller means compising a single large roller and said second roller means comprising plural smaller rollers arcuately disposed around said single large roller; said pivotally movable support means being pivotally movable about the axis of said first roller means; said forming and welding means being carried on said pivotally movable support means.

39. The combination of claim 38, said forming means comprising at least one roll forming means.

40. The combination of claim 38, said welding means comprising at least one welding machine.

41. The combination of claim 40, at least one welding machine being insertable into said pipe where said pipe is open during forming thereof.

42. The combination of claim 40, at least one welding matching being disposed exteriorly of said pipe after forming thereof.

43. Apparatus for continuously discharging pipe from a traveling support, comprising means for longitudinally conveying a continuous metal strip of uniform width, means for controlling the tensions of said strip discharged from said conveying means, means for forming and welding said discharged strip into a pipe and pivotally movable support means for directing said pipe from said traveling support to a continuous pipeline being laid from said traveling suport; said tension controlling means comprising first and second roller means disposed oppposedly against opposite sides of said strip, said first roller means comprising a single large roller and said second roller means comprising plural smaller rollers arcuately disposed around said single large roller; said first roller means being disposed in elevated position at one end of said longitudinal conveying means, and said second roller means being disposed arcuately around an upper portion of said first roller means, said forming and welding means being carried on said pivotally movable support means.

44. The combination of claim 43, said forming means comprising at least one roll forming means.

45. The combination of claim 43, said welding means comprising at least one welding machine.

46. The combination of claim 45, at least one welding machine being insertable into said pipe where said pipe is open during forming thereof.

47. The combination of claim 45, at least one welding machine being disposed exteriorly of said pipe after forming thereof.

* * * * *